(12) United States Patent
Bauer

(10) Patent No.: US 7,557,697 B2
(45) Date of Patent: Jul. 7, 2009

(54) SYSTEM TO MEASURE WHEEL LIFTOFF

(75) Inventor: Geoffrey Burke Bauer, Oxford, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 185 days.

(21) Appl. No.: 11/062,380

(22) Filed: Feb. 22, 2005

(65) Prior Publication Data

US 2006/0190143 A1    Aug. 24, 2006

(51) Int. Cl.
*B60Q 1/00* (2006.01)
(52) U.S. Cl. .................. 340/440; 340/438; 340/441; 340/465; 340/426.33; 340/425.5; 701/36; 701/41; 701/47; 701/70
(58) Field of Classification Search .......... 340/440, 340/441, 438, 465, 426.33, 425.5; 701/36, 701/41–47, 70–71
See application file for complete search history.

(56) References Cited

U.S. PATENT DOCUMENTS

| | | | |
|---|---|---|---|
| 4,203,612 A * | 5/1980 | Feikema | 280/287 |
| 4,927,173 A | 5/1990 | Clifton, Jr. | |
| 5,553,491 A * | 9/1996 | Naito et al. | 73/146.5 |
| 5,610,575 A | 3/1997 | Gioutsos | |
| 5,723,768 A * | 3/1998 | Ammon | 73/8 |
| 5,742,918 A | 4/1998 | Ashrafi et al. | |
| 5,742,919 A | 4/1998 | Ashrafi et al. | |
| 5,787,375 A | 7/1998 | Madau et al. | |
| 5,790,966 A | 8/1998 | Madau et al. | |
| 5,809,434 A | 9/1998 | Ashrafi et al. | |
| 5,825,284 A | 10/1998 | Dunwoody et al. | |
| 5,826,207 A * | 10/1998 | Ohashi et al. | 701/36 |
| 5,852,787 A | 12/1998 | Fodor et al. | |
| 5,948,027 A | 9/1999 | Oliver, Jr. et al. | |
| 5,971,503 A | 10/1999 | Joyce et al. | |
| 6,002,974 A * | 12/1999 | Schiffmann | 701/36 |
| 6,053,583 A | 4/2000 | Izumi et al. | |
| 6,065,558 A | 5/2000 | Wielenga | |
| 6,122,568 A | 9/2000 | Madau et al. | |
| 6,142,026 A * | 11/2000 | Ohashi et al. | 73/865.9 |
| 6,158,274 A | 12/2000 | Guo et al. | |
| 6,169,939 B1 | 1/2001 | Raad et al. | |

(Continued)

FOREIGN PATENT DOCUMENTS

DE    3600708    7/1987

(Continued)

OTHER PUBLICATIONS

SAE Technical Paper Series, 2002-01-1183, Mar. 4-7, 2002, pp. 1-3; Estimation of Tire-Road Friction Using Tire Vibration Mode; Takaji Umeno, Eichi Ono, Katsuhiro Asano, Shoji Ito, Akira Tanaka, Yoshiyuki Yasui and Mamoru Sawada.

*Primary Examiner*—Daniel Wu
*Assistant Examiner*—Son M Tang

(57) ABSTRACT

The present invention is directed to a system for determining lift-off or wheel departure of one or more wheels associated with a vehicle from a road. The system includes a sensor that measures the wheel speed of at least one wheel, and a controller that calculates the resonance frequency of the at least one wheel, calculates variations in the resonance frequency, compares the variations with a threshold, and indicates lift-off of the wheel from the road if the variations exceed a threshold.

20 Claims, 4 Drawing Sheets

U.S. PATENT DOCUMENTS

| | | | |
|---|---|---|---|
| 6,185,497 B1 * | 2/2001 | Taniguchi et al. | 701/70 |
| 6,220,095 B1 | 4/2001 | Fennel et al. | |
| 6,233,505 B1 | 5/2001 | Kranz et al. | |
| 6,249,721 B1 | 6/2001 | Lohberg et al. | |
| 6,263,261 B1 | 7/2001 | Brown et al. | |
| 6,278,361 B1 * | 8/2001 | Magiawala et al. | 340/438 |
| 6,282,474 B1 | 8/2001 | Chou et al. | |
| 6,321,141 B1 * | 11/2001 | Leimbach | 701/1 |
| 6,324,446 B1 | 11/2001 | Brown et al. | |
| 6,327,526 B1 | 12/2001 | Hagan | |
| 6,330,496 B1 | 12/2001 | Latarnik et al. | |
| 6,332,104 B1 | 12/2001 | Brown et al. | |
| 6,338,012 B2 | 1/2002 | Brown et al. | |
| 6,347,541 B1 | 2/2002 | Maleki | |
| 6,351,694 B1 | 2/2002 | Tseng et al. | |
| 6,353,777 B1 | 3/2002 | Harmison et al. | |
| 6,356,188 B1 * | 3/2002 | Meyers et al. | 340/440 |
| 6,364,435 B1 | 4/2002 | Gronau et al. | |
| 6,366,844 B1 | 4/2002 | Woywod et al. | |
| 6,374,163 B1 | 4/2002 | Lou et al. | |
| 6,397,127 B1 | 5/2002 | Meyers et al. | |
| 6,409,286 B1 | 6/2002 | Fennel | |
| 6,424,907 B1 | 7/2002 | Rieth et al. | |
| 6,434,451 B1 | 8/2002 | Lohberg et al. | |
| 6,435,626 B1 | 8/2002 | Kostadina | |
| 6,438,464 B1 | 8/2002 | Woywod et al. | |
| 6,471,218 B1 | 10/2002 | Burdock et al. | |
| 6,477,480 B1 | 11/2002 | Tseng et al. | |
| 6,496,758 B2 | 12/2002 | Rhode et al. | |
| 6,526,334 B1 | 2/2003 | Latarnik et al. | |
| 6,526,342 B1 | 2/2003 | Burdock et al. | |
| 6,529,803 B2 | 3/2003 | Meyers et al. | |
| 6,554,293 B1 | 4/2003 | Fennel et al. | |
| 6,556,908 B1 | 4/2003 | Lu et al. | |
| 6,593,849 B2 | 7/2003 | Chubb et al. | |
| 6,614,343 B1 | 9/2003 | Fennel et al. | |
| 6,631,317 B2 | 10/2003 | Lu et al. | |
| 6,644,108 B2 * | 11/2003 | Inoue | 73/146 |
| 6,654,674 B2 | 11/2003 | Lu et al. | |
| 6,658,342 B1 | 12/2003 | Hac | |
| 6,671,595 B2 | 12/2003 | Lu et al. | |
| 6,759,952 B2 * | 7/2004 | Dunbridge et al. | 340/444 |
| 6,799,092 B2 | 9/2004 | Lu et al. | |
| 7,031,816 B2 * | 4/2006 | Lehmann et al. | 701/48 |
| 2001/0008986 A1 | 7/2001 | Brown et al. | |
| 2002/0056582 A1 | 5/2002 | Chubb et al. | |
| 2002/0139599 A1 | 10/2002 | Lu et al. | |
| 2003/0065430 A1 | 4/2003 | Lu et al. | |
| 2003/0100979 A1 | 5/2003 | Lu et al. | |
| 2003/0116373 A1 | 6/2003 | Miller et al. | |
| 2003/0130775 A1 | 7/2003 | Lu et al. | |
| 2003/0130778 A1 | 7/2003 | Hrovat et al. | |
| 2003/0163231 A1 | 8/2003 | Meyers et al. | |
| 2004/0041358 A1 | 3/2004 | Hrovat et al. | |
| 2004/0111208 A1 | 6/2004 | Meyers et al. | |
| 2004/0199314 A1 | 10/2004 | Meyers et al. | |
| 2005/0000278 A1 * | 1/2005 | Haralampu et al. | 73/146 |

FOREIGN PATENT DOCUMENTS

| | | |
|---|---|---|
| DE | 4242788 | 7/1993 |
| JP | 63116918 | 5/1988 |
| WO | WO 97/47485 | 12/1997 |
| WO | WO 99/30941 | 6/1999 |
| WO | WO 99/30942 | 6/1999 |
| WO | WO 00/03887 | 1/2000 |
| WO | WO 00/03900 | 1/2000 |
| WO | WO 01/12483 A1 | 2/2001 |
| WO | WO 02/36401 A1 | 3/2002 |
| WO | WO 02/100696 1 | 12/2002 |
| WO | WO 03/002392 A1 | 1/2003 |

* cited by examiner

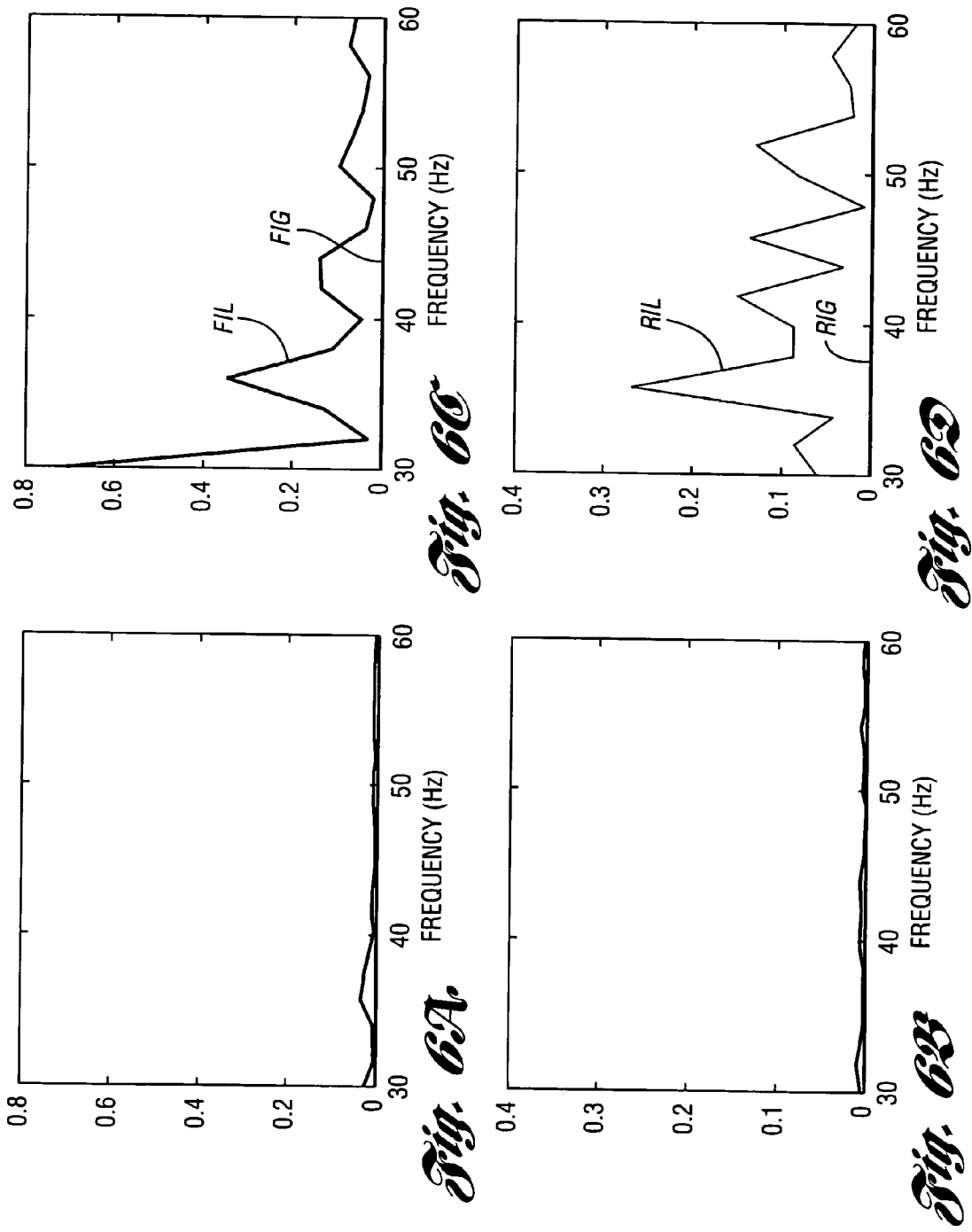

SYSTEM TO MEASURE WHEEL LIFTOFF

BACKGROUND

The present invention generally relates to rollover protection systems.

Dynamic control systems have been recently introduced in automotive vehicles for measuring the body states of the vehicle and controlling the dynamics of the vehicle based on the measured body states. For example, certain dynamic stability control systems known broadly as control systems compare the desired direction of the vehicle based on the steering wheel angle, the direction of travel and other inputs, and control the yaw of the vehicle by controlling the braking effort at the various wheels of the vehicle. By regulating the amount of braking torque applied to each wheel, the desired direction of travel may be maintained. Commercial examples of such systems are known as dynamic stability program (DSP) or electronic stability control (ESC) systems.

Other systems measure vehicle characteristics to prevent vehicle rollover and for tilt control (or body roll). Tilt control maintains the vehicle body on a plane or nearly on a plane parallel to the road surface, and rollover control maintains the vehicle wheels on the road surface. Certain systems use a combination of yaw control and tilt control to maintain the vehicle body horizontal while turning. Commercial examples of these systems are known as anti-rollover prevention (ARP) and rollover stability control (RSC) systems.

Typically, such control systems referred here collectively as dynamic stability control systems use dedicated sensors that measure the yaw or roll of the vehicle. However, yaw rate and roll rate sensors are costly. Therefore, it would be desirable to use a general sensor to determine, for example, the rollover propensity of the vehicle, that is, a sensor that is not necessarily dedicated to measuring the roll of the vehicle. The invention may also augment a system that includes yaw and/or roll rate sensors.

SUMMARY

In satisfying the above need, as well as overcoming the enumerated drawbacks and other limitations of the related art, the present invention provides a system and method for determining lift-off or wheel departure of one or more wheels associated with a vehicle from a road. The system includes a sensor that measures the wheel speed of at least one wheel, and a controller that calculates the resonance frequency of the at least one wheel, calculates variations in the resonance frequency, compares the variations with a threshold, and indicates lift-off of the wheel from the road if the variations exceed a threshold.

Further features and advantages of this invention will become apparent from the following description, and from the claims.

BRIEF DESCRIPTION OF THE DRAWINGS

FIG. 6A illustrates the frequency response of a front outer wheel during another fishhook maneuver;

FIG. 6B illustrates the frequency response of a rear outer wheel during the fishhook maneuver;

FIG. 6C illustrates the frequency response of a front inner wheel during the fishhook maneuver; and FIG. 6D illustrates the frequency response of a rear inner wheel during the fishhook maneuver.

DETAILED DESCRIPTION

Figure 1:
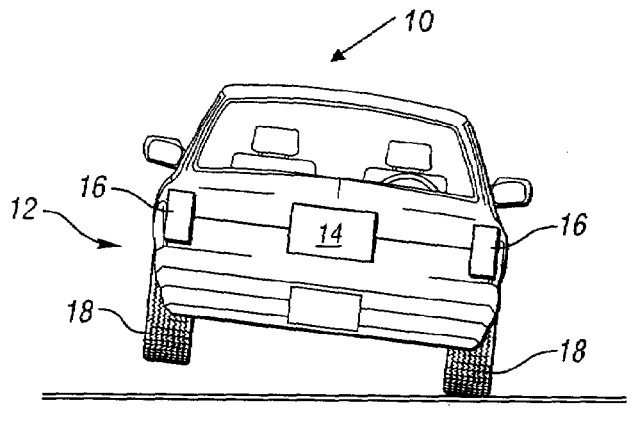
FIG. 1 depicts a vehicle with a tire lift off detection system in accordance with the invention.

Referring now to FIG. 1, a vehicle 10 includes a rollover control system 12 embodying the principles of the present invention. The system 12 identifies dynamic characteristics and conditions of the vehicle 10 to reduce the rollover propensity of the vehicle 10 in actual driving conditions. In certain implementations, the system 12 may be a component of a dynamic stability control system.

Figure 2:
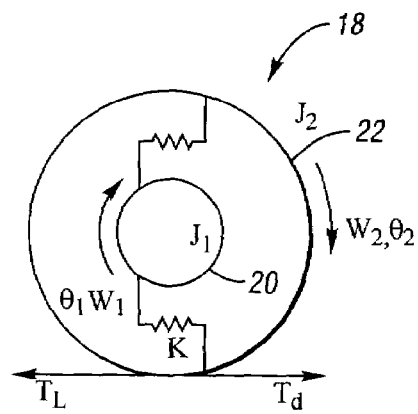
FIG. 2 is a schematic of a system model for determining wheel lift-off in accordance with the invention.

The system 12 includes a controller 14 and various sensors 16 associated with the wheels 18. In the present embodiment, the sensors 16 measure the speed of the respective wheels. This information is transmitted to the controller 14 which analyzes the information to estimate the vertical load on the tires. Specifically, each wheel 18 has a tire 22 mounted on a hub 20 and is modeled as a second order spring-mass-damper model as shown in FIG. 2 to determine a resonance frequency, $\omega_n$, of the wheel, according to the system of equations:

$$\Theta_1 - \Theta_2 = \Theta_s$$
$$J_1 \dot{\omega}_1 = -K\Theta_s \quad (1)$$
$$J_2 \dot{\omega}_2 = K\Theta_s + T_L + T_d$$

where $\Theta_1$ is the rotational angle of the wheel $\Theta_2$ is the rotational angle of the tire $\Theta_s$ is the difference between $\Theta_1$ and $\Theta_2$ $J_1$ is the rotational moment of inertia of the hub $J_2$ is the rotational moment of inertia of the tire K is a spring constant $\omega_1$ is the rotational velocity of the hub $\omega_2$ is the rotational velocity of the tire $\dot{\omega}_1$ is the rotational acceleration of the hub $\dot{\omega}_2$ is the rotational acceleration of the tire $T_L = F_x R$ is the longitudinal torque on the tire $F_x$ is the longitudinal force on tire R is the radius of the tire (from center of hub)

$T_d$ are road disturbances (i.e. "Noise")

To linearize and simplify the system Eq. (1), a perturbation of $T_L$ at an operating point $S_v = S_{vO}$ is derived to yield $$\Delta T_L = \left.\frac{\partial T_L}{\partial S_v}\right|_{S_v = S_{vO}} \Delta S_v \qquad (2)$$
$$= \alpha R^2 (\Delta V / R - \Delta \omega_2)$$

where $S_v = V - \omega R$ is the slip velocity $\omega$ is the angular velocity of the wheel V is the velocity of the vehicle $\alpha$ is the extended brake stiffness defined as the gradient of $F_x$ at $S_v = S_{vO}$, and $\omega_n$ is the natural frequency of the model Since the inertia of the vehicle is significantly larger than that of the wheel, the assumption $|\Delta\omega_2| \gg |\Delta V/R|$ is made such that Eq. (2) simplifies to $$\Delta T_L = -\alpha R^2 \Delta \omega_2 \qquad (3)$$

From the perturbation of system (1) and Eq. (3), transfer function from the road disturbance $\Delta T_d$ to wheel speed $\Delta \omega_1$ is obtained as follows:

$$H(s) = \frac{K}{J_1 J_2 s^3 + J_1 \alpha R^2 s^2 + K(J_1 + J_2)s + K\alpha R^2} \qquad (4)$$

Since the target of the estimation is $\alpha$, the second order system is enough as a vibration model. To reduce order, the 3rd order term of H(s) is estimated:

$$G(s) = \frac{K}{J_1 \alpha R^2 s^2 + K(J_1 + J_2)s + K\alpha R^2} = \frac{b_2}{s^2 + a_1 s + a_2} \qquad (5)$$

where $$a_1 = \frac{K(J_1 + J_2)}{J_1 \alpha R^2}$$

$$a_2 = \frac{K}{J_1}$$

$$b_2 = \frac{K}{J_1 \alpha R^2}$$

such that the resonance frequency, $\omega_n$, is $$\omega_n = \frac{1}{2\pi} \sqrt{\frac{K}{J_1}}$$

or $$\omega_n = \frac{1}{2\pi} \sqrt{a_2}$$

and the strength of the resonance depends on the extended brake stiffness $\alpha$ and the tire-road friction.

Thus, the system 12 uses a second order spring-mass-damper model as shown in FIG. 2, and the wheel speed of the wheel 20 to estimate a resonance frequency, $\omega_n$, using a filter, such as a RLS or Kalman filter. The resonance frequency, typically in the range between about 30 and 60 Hz, is correlated to the vertical force on the tire.

Figure 3:
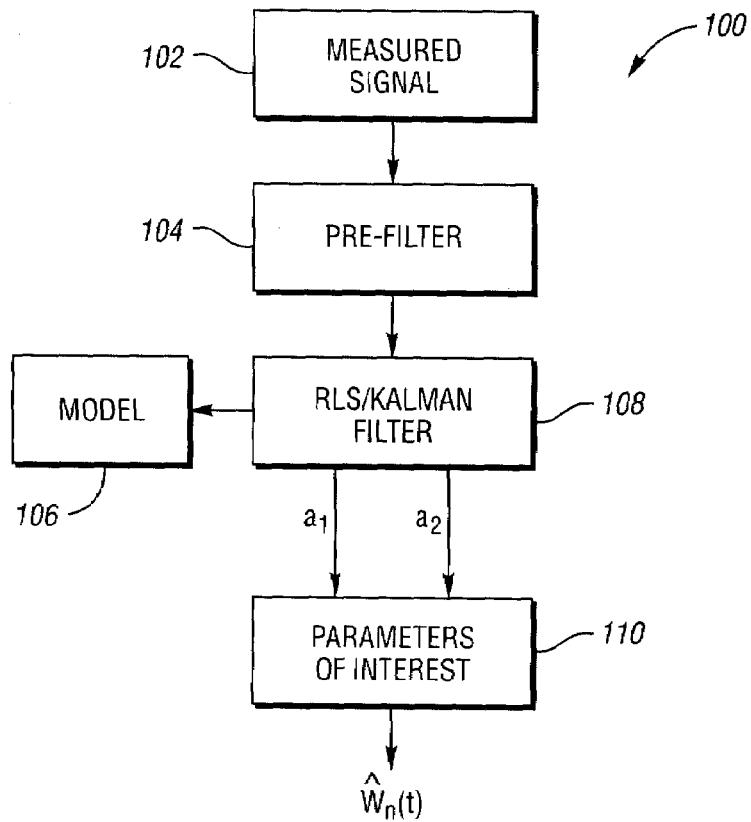
FIG. 3 is a flow diagram of a sequence of steps to determine wheel lift-off.

Shown in FIG. 3 is a preferred process 100 that illustrates the operation of the system 10. A measured signal 102, such as the wheel speed, may be pre-filtered 104 before the resonance frequency is estimated to remove noise and unwanted information from the signal 102. A RLS or Kalman filter 108 receives the signal from the pre-filter 104 and employs a model 106, for example, as described by the system of Eq. (1), to calculate the parameters of interest $\alpha_1$ and $\alpha_2$ which module 110 employs to calculate the resonance frequency $\omega_n$. If variations in the resonance frequency exceed a threshold, the system 10 can indicate to the roll over prevention system or the driver that a wheel has lifted off the ground.

The pre-deviations in the estimated resonance frequency during a validity window indicates a deviation of the vertical load on the tire. When the resonance frequency reaches a pre-determined threshold, the algorithm indicates a wheel lift status condition. The status of all four wheels can be monitored continuously. Alternatively, only the outer wheels can be monitored to conserve processing resources. The wheel lift status condition from the monitored wheels can be combined to provide more detailed wheel lift indication, such as no-wheel-lift, single-wheel-lift, two-wheel-lift, or single-wheel-lift with impending two-wheel-lift.

FFT processing of wheel speed data from an implementation of the system 10 are illustrated in the following examples. FIG. 4 shows the characteristics of a vehicle in a double-fishhook maneuver. In these figures, the x-axis is the frequency spectrum and the y-axis is the signal power.

Figure 4A:
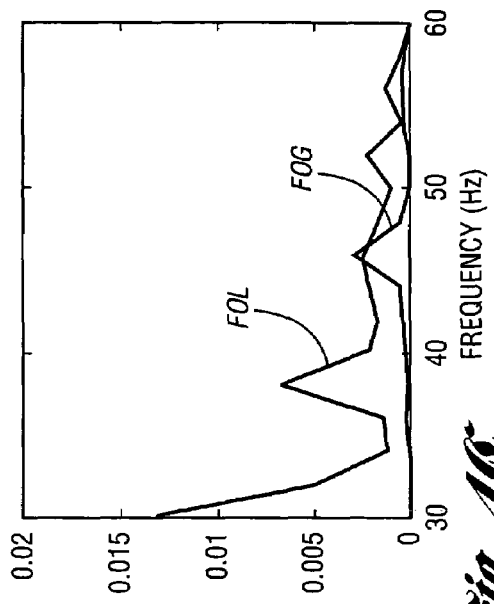
FIG. 4A illustrates the frequency response of a front inner wheel during a double fishhook maneuver.
Figure 4C:
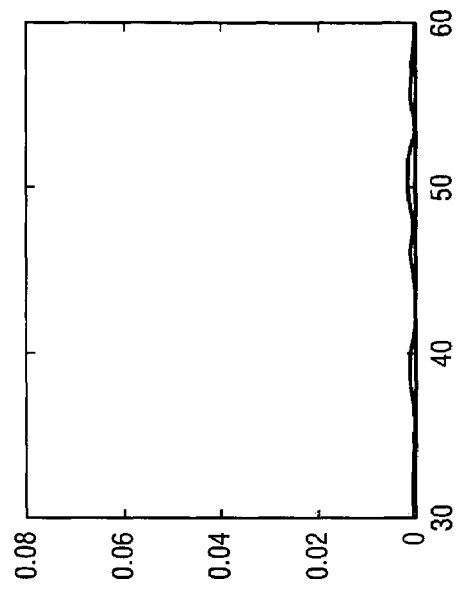
FIG. 4C illustrates the frequency response of a front outer wheel during the double fishhook maneuver.
Figure 4B:
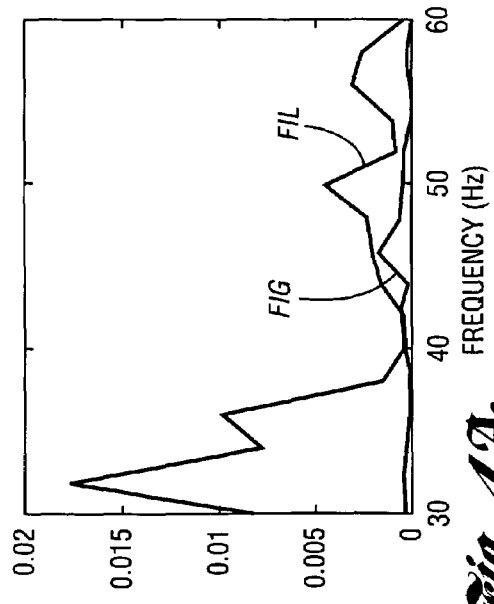
FIG. 4B illustrates the frequency response of a rear inner wheel during the double fishhook maneuver.
Figure 4D:
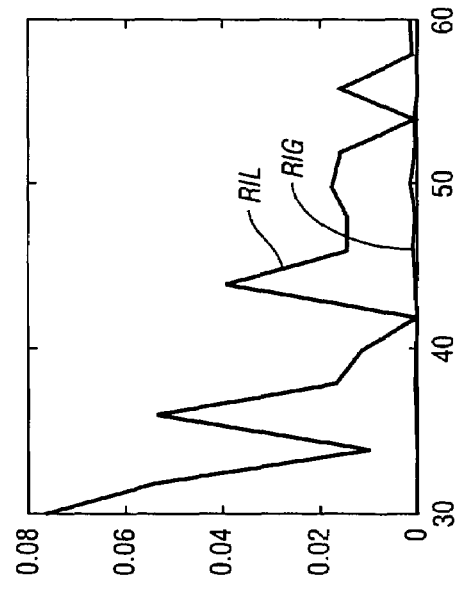
FIG. 4D illustrates the frequency response of a rear outer wheel during the double fishhook maneuver.
Figure 5A:
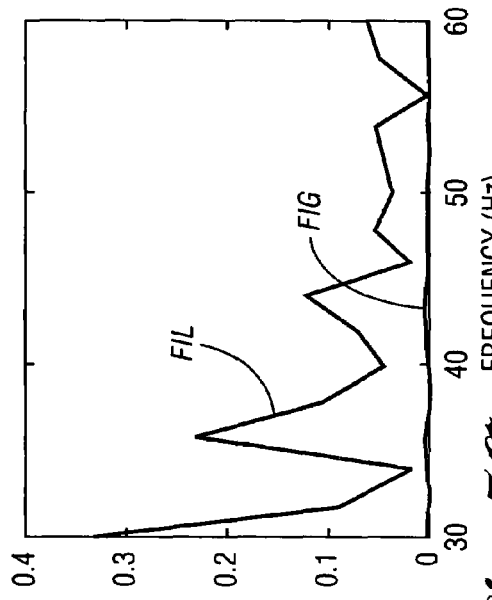
FIG. 5A illustrates the frequency response of a front outer wheel during a fishhook maneuver.
Figure 5B:
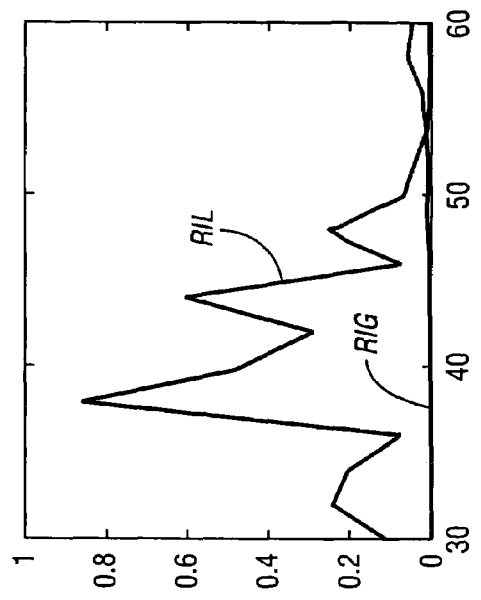
FIG. 5B illustrates the frequency response of a rear outer wheel during the fishhook maneuver.
Figure 5C:
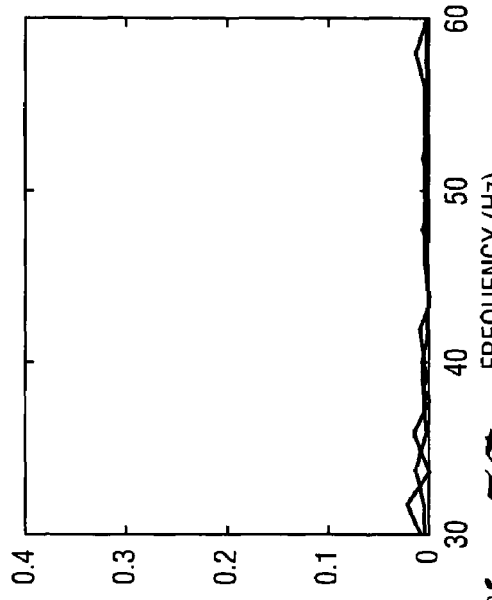
FIG. 5C illustrates the frequency response of a front inner wheel during the fishhook maneuver.
Figure 5D:
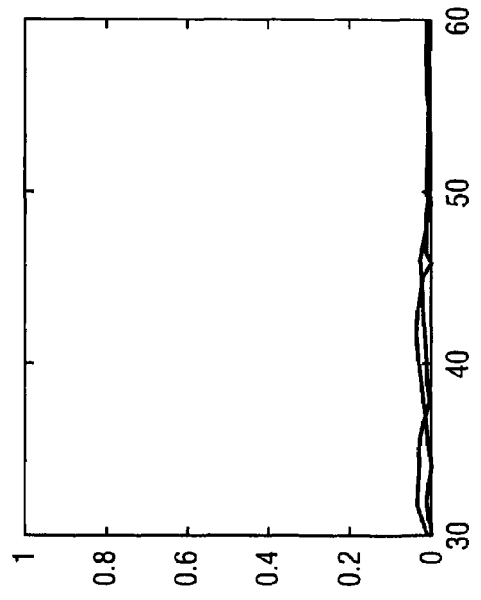
FIG. 5D illustrates the frequency response of a rear inner wheel during the fishhook maneuver.

FIGS. 4A and 4B show the behavior of the front inner wheel and the rear inner wheel, respectively, and FIGS. 4C and 4D show the behavior of the front outer wheel and the rear outer wheel, respectively. As shown in FIGS. 4A, 4B, and 4C, the symbols FIG, RIG, and FOG represent the data for when all the tires are grounded (i.e. when some load greater than zero is being applied to the tire) prior to the test event for the front inner wheel, the rear inner wheel, and the front outer wheel, respectively. The symbols FIL, RIL, and FOL represent the data for the tires during the test event when one or more tires is lifted off the ground (i.e. when a zero normal load is being applied to the tire) for the front inner wheel, the rear inner wheel, and the front outer wheel, respectively. As shown in FIG. 4D, the difference between the lifted and the grounded data for the rear outer wheel is barely perceptible. Thus, FIG. 4 demonstrates that the system 10 can detect the difference between the characteristics of a lifted tire and that of a grounded tire.

FIGS. 5 and 6 illustrate the characteristics of a vehicle in two different fishhook maneuvers. FIGS. 5A and 6A refer to the front outer wheel and FIGS. 5B and 6B refer to the rear outer wheel in the two tests, which show that there is minor difference between the lifted and grounded characteristics of the outer wheels. Referring to FIGS. 5C, 5D, 6C, and 6D, the symbols FIG and RIG indicated that the signals for the front inner grounded and the rear inner grounded wheels are barely perceptible. On the other hand, the symbols FIL and RIL indicated that there are noticeable spectra for the front inner lifted and the rear inner lifted wheels during the fishhook maneuver.

In other embodiments, other conditions may be monitored, including the wheel speed, suspension travel, and sidewall torsion (i.e. smart tire). When the suspension travel is measured, a quarter-car model describing the suspension-tire characteristic and the measured suspension travel is employed to estimate the resonance frequency of the tire, which is correlated to the vertical force on the tire.

As a person skilled in the art will readily appreciate, the above description is meant as an illustration of an implementation of the principles this invention. This description is not intended to limit the scope or application of this invention in that the invention is susceptible to modification, variation and change, without departing from spirit of this invention, as defined in the following claims.

What is claimed is:

1. A method of determining wheel departure from a road comprising:
    measuring the wheel speed of four wheels;
    calculating a resonance frequency of the four wheels based at least in part on wheel speed;
    calculating variations in the amplitude of the resonance frequency;
    comparing the variations in the amplitude of the resonance frequency with a threshold;
    indicating a complete lift-off condition of a wheel from the road if the variations exceed a threshold, the wheel being lifted off of a contact surface leaving an air gap between the wheel and the contact surface in the lift-off condition; and
    determining and providing a wheel lift status condition that provides whether the complete lift-off condition is no-wheel lift, single-wheel lift, two-wheel lift or single-wheel lift. with impending two-wheel lift.

2. The method of claim 1 wherein the measuring provides a signal that is subsequently filtered in a filter.

3. The method of claim 2 wherein the filter employs a second order spring-mass-damper model of the wheel to generate parameters of interest.

4. The method of claim 3 wherein the parameters of interest are input data to calculate the resonance frequency.

5. The method of claim 2 wherein the filter is a Recursive Least Squares (RLS) filter.

6. The method of claim 2 wherein the filter is a Kalman filter.

7. The method of claim 2 wherein the signal is transmitted to a pre-filter before the filter to remove noise and unwanted information.

8. The method of claim 1, further comprising correlating the resonance frequency to a vertical force on the wheel.

9. The method of claim 1, wherein the at least one wheel comprises four wheels, and further comprising the step of providing a wheel lift status condition.

10. The system of claim 1, further comprising the step of providing a second order spring-mass-damper model of the wheel, and wherein the step of calculating the resonance frequency includes calculating the resonance frequency based on the wheel speed and the second order spring-mass-damper model.

11. A system for determining wheel departure from a road comprising:
    a sensor that measures the wheel speed of four wheels; and
    a controller that calculates a resonance frequency of the wheels based at least in part on the wheel speed, calculates variations in the amplitude of the resonance frequency, compares the variations with a threshold to determine whether a complete lift-off condition of the wheel from the road occurred, and whether the complete lift-off condition is no-wheel lift, single-wheel lift, two-wheel lift or single-wheel lift with impending two-wheel lift and indicates the specific lift-off condition if the variations exceed the threshold.

12. The system of claim 8 further comprising a filter that filters a signal associated with the wheel speed.

13. The system of claim 12 wherein the filter employs a second order spring-mass-damper model of the wheel to generate parameters of interest.

14. The system of claim 13 wherein the parameters of interest are input data to calculate the resonance frequency.

15. The system of claim 12 wherein the filter is a Recursive Least Squares (RLS) filter.

16. The system of claim 12 wherein the filter is a Kalman filter.

17. The system of claim 12 further comprising a pre-filter wherein the signal is transmitted to a pre-filter to remove noise and unwanted information.

18. The system of claim 11, the controller correlating the resonance frequency to a vertical force on the wheel.

19. The system of claim 11, further comprising an indicator that provides a wheel lift status condition, the wheel lift status condition being provided as at least one of the following: no-wheel lift, single-wheel lift, two-wheel lift, and single-wheel lift with impending two-wheel lift.

20. The system of claim 11, the system being a component of a dynamic stability control system.

* * * * *